United States Patent [19]
Hsiao

[11] Patent Number: 5,794,958
[45] Date of Patent: Aug. 18, 1998

[54] FOLDABLE BICYCLE FRAME

[76] Inventor: Yun-Lung Hsiao, 4F, No. 3, Lane 70, Hsueh-Cheng Rd., Tu-Cheng City, Taipei Hsien, Taiwan

[21] Appl. No.: 735,272

[22] Filed: Oct. 22, 1996

[51] Int. Cl.$^6$ .................................................. B62K 15/00
[52] U.S. Cl. ........................ 280/287; 280/278; 280/288.4
[58] Field of Search ................................ 280/287, 288.4, 280/639, 87.05, 278

[56] References Cited

U.S. PATENT DOCUMENTS

| | | | |
|---|---|---|---|
| 3,623,749 | 11/1971 | Jensen | 280/287 |
| 3,990,717 | 11/1976 | Best | 280/287 |
| 4,132,428 | 1/1979 | Lassiere | 280/278 |
| 4,448,435 | 5/1984 | Hon | 280/287 |
| 4,460,191 | 7/1984 | Ishibashi et al. | 280/278 |
| 4,582,335 | 4/1986 | Paioli et al. | 280/278 |
| 5,205,573 | 4/1993 | Mhedhbi | 280/287 |
| 5,398,955 | 3/1995 | Yeh | 280/287 |

FOREIGN PATENT DOCUMENTS

| | | | |
|---|---|---|---|
| 435978 | 1/1975 | U.S.S.R. | 280/278 |

Primary Examiner—Brian L. Johnson
Assistant Examiner—Gary Savitt
Attorney, Agent, or Firm—Finnegan, Henderson, Farabow, Garrett & Dunner, L.L.P.

[57] ABSTRACT

A foldable bicycle frame includes a head tube, a downtube unit, a chain stay unit, a telescopic seat unit, and a seat stay unit. The head tube is adapted to be coupled with a front fork for carrying a front bicycle wheel. The downtube unit has a front end connected to the head tube, and a rear end. The chain stay unit has a horizontal front end portion that is connected foldably to the rear end of the downtube unit and that is adapted to be mounted with a crank arm assembly, an inclined vertical rear end portion, and a middle portion that is between the front and rear end portions and that is provided with means for carrying a rear bicycle wheel thereon. The telescopic seat unit has a top end adapted to be mounted with a bicycle seat thereon and a bottom end connected pivotally to the front end portion of the chain stay unit. The seat stay unit has a front end pivoted to the top end of the seat unit and a rear end pivoted to the rear end portion of the chain stay unit.

6 Claims, 5 Drawing Sheets

FOLDABLE BICYCLE FRAME

BACKGROUND OF THE INVENTION

1. Field of the Invention

The present invention relates to a foldable bicycle frame, more particularly to a foldable bicycle frame which occupies a relatively small space when folded.

2. Description of the Related Art

A conventional foldable bicycle frame is generally provided with folding means to fold the bicycle frame into a structure that occupies less space and that is convenient to carry. However, the conventional foldable bicycle frame has an integrally formed rear frame portion which includes a seat stay, a seat tube and a chain stay. The integrally formed rear frame portion still occupies a large amount of space even after the bicycle frame is folded.

SUMMARY OF THE INVENTION

The main object of the present invention is to provide a foldable bicycle frame which occupies a relatively small space when folded.

Another object of the present invention is to provide a foldable bicycle frame that includes a telescopic seat unit for adjusting the height of the bicycle seat.

Accordingly, the foldable bicycle frame according to the present invention includes a head tube, a downtube unit, a chain stay unit, a telescopic seat unit, and a seat stay unit. The head tube is adapted to be coupled with a front fork for carrying a front bicycle wheel. The downtube unit has a front end connected to the head tube, and a rear end. The chain stay unit has a horizontal front end portion that is connected foldably to the rear end of the downtube unit and that is adapted to be mounted with a crank arm assembly, an inclined vertical rear end portion, and a middle portion that is between the front and rear end portions and that is provided with means for carrying a rear bicycle wheel thereon. The telescopic seat unit has a top end adapted to be mounted with a bicycle seat thereon and a bottom end connected pivotally to the front end portion of the chain stay unit. The seat stay unit has a front end pivoted to the top end of the seat unit and a rear end pivoted to the rear end portion of the chain stay unit. Therefore, when the telescopic seat unit is adjusted to have a shorter length, the chain stay unit and the seat stay unit is simultaneously adjusted to result in a structure that occupies a relatively small amount of space.

Preferably, the foldable bicycle frame according to the present invention further includes a carrier rack that can be folded on the seat stay and that can be unfolded for placing objects thereon.

Moreover, the foldable bicycle frame according to the present invention further includes a folding unit for pivotally connecting the downtube unit to the chain stay unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
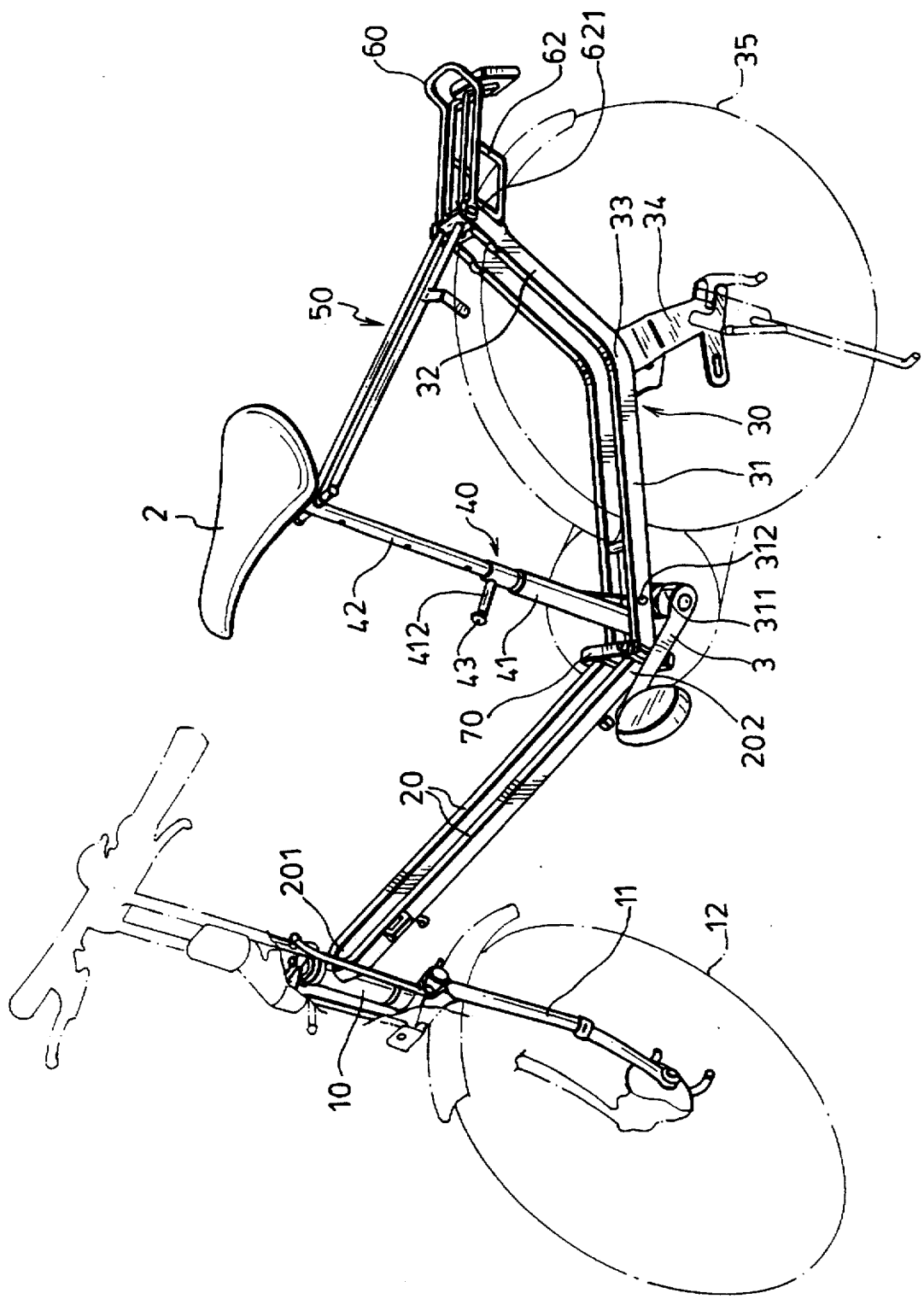
FIG. 1 is a schematic view illustrating the foldable bicycle frame according to a preferred embodiment of the present invention.
Figure 2:
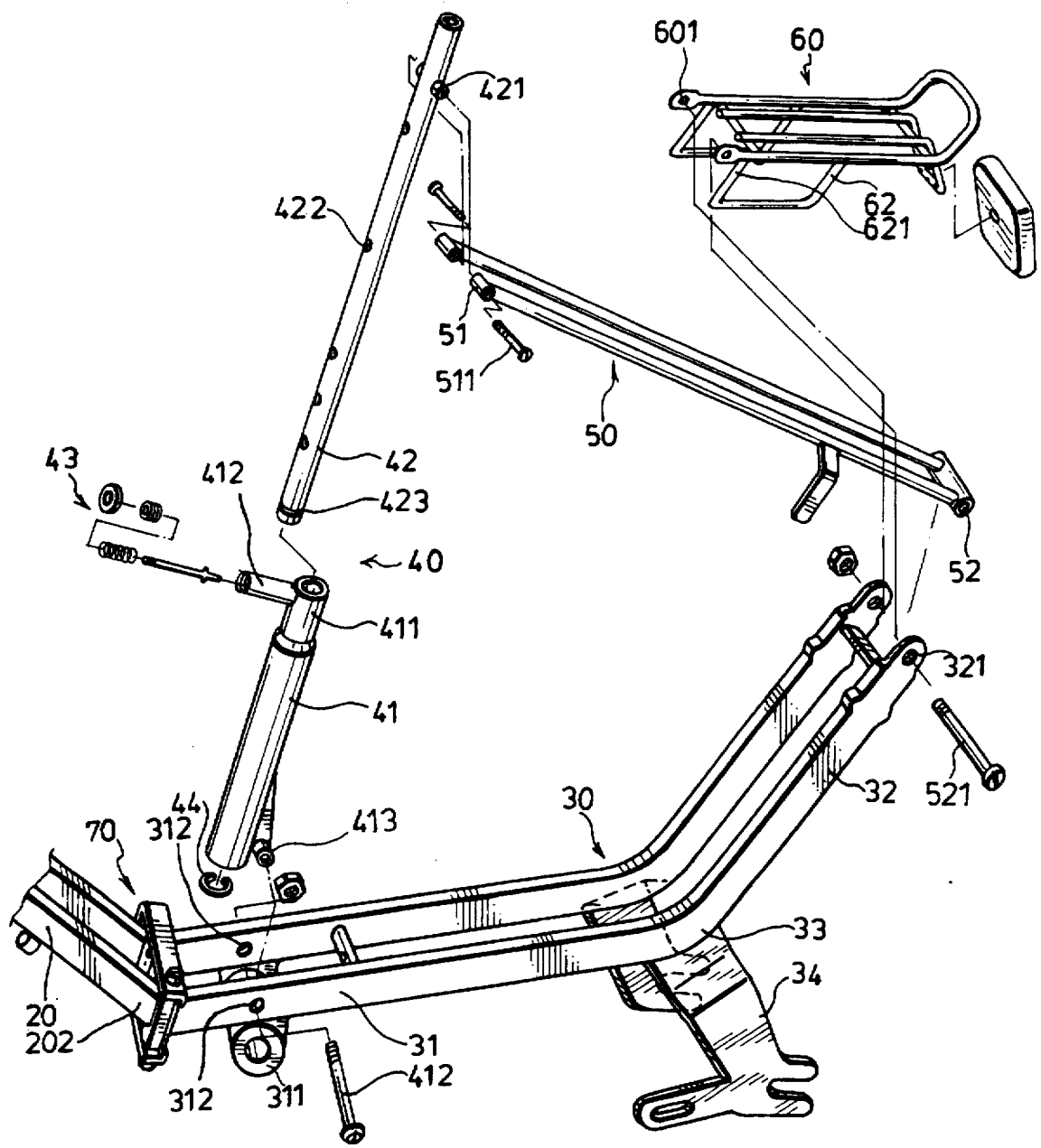
FIG. 2 is an exploded perspective view illustrating a rear frame portion of the foldable bicycle frame according to the preferred embodiment.

Referring to FIGS. 1 and 2, the foldable bicycle frame 1 according to the preferred embodiment of the present invention is shown to include a head tube 10, a downtube unit 20, a chain stay unit 30, a telescopic seat unit 40, a seat stay unit 50 and a carrier rack 60.

The head tube 10 is adapted to be coupled with a front fork 11 for carrying a front bicycle wheel 12.

The downtube unit 20 is composed of a pair of downtube bars which are generally parallel to each other. The downtube unit 20 has a front end 201 connected to the head tube 10, and a rear end 202.

The chain stay unit 30 is composed of a parallel pair of chain stay bars. The chain stay unit 30 has a horizontal front end portion 31, an inclined vertical rear end portion 32, and a middle portion 33 that is between the front and rear end portions 31 and 32. The front end portion 31 is connected foldably to the rear end 202 of the downtube unit 20 and is provided with a horizontal crank tube 311 that is adapted to be mounted pivotally with a crank arm assembly 3. The front end portion 31 is further formed with a pair of first mounting holes 312. The rear end portion 32 is formed with a pair of second mounting holes 321. The middle portion 33 is provided with means 34 for carrying a rear bicycle 35 thereon. The foldable bicycle frame 1 is further provided with a folding unit 70 (which will be described later) for pivotally connecting the downtube unit 20 to the chain stay unit 30.

The telescopic seat unit 40 includes a hollow seat tube 41 and a seat post 42. The hollow seat tube 41 has a restricted top end portion 411 formed with a radial tube extension 412 and a bottom end portion provided with a transversely disposed first mounting tube 413 that is perpendicular to the seat tube 41. The hollow seat tube 41 is connected pivotally to the front end portion 31 of the chain stay unit 30 by means of a first pivot bolt 412 that extends through the pair of first mounting holes 312 and the first mounting tube 413. The seat post 42 extends slidably into the seat tube 41. The seat post 42 has a top end adapted to be mounted with a bicycle seat 2 and connected pivotally to the front end of the seat stay unit 50, and a bottom end formed with an annular groove 423. The top end of the seat post 42 is provided with a pair of internally threaded tubular extensions 421. The seat post 42 is further formed with a plurality of axially aligned radial holes 422. The seat unit 40 further includes a known spring-loaded pin unit 43 that extends removably through the radial tube extension 412 and into a selected one of the radial holes 422 to permit adjusting of the length of the seat unit 40. The seat unit 40 is further provided with a C-shaped retaining member 44 that engages the annular groove 423 formed in the seat post 42 to prevent removal of the seat post 42 from the seat tube 41.

The seat stay unit 50 is composed of a parallel pair of seat stay rods. The seat stay unit 50 has a front end provided with a pair of second mounting tubes 51 that are respectively disposed adjacent to the tubular extensions 421 on the top end portion of the seat post 42. The front end of the seat stay unit 50 is pivoted to the top end portion of the seat post 42 by means of a pair of second pivot bolts 511, each of which extends into one of the second mounting tubes 51 and an adjacent one of the tubular extensions 421 and threadedly engages the latter. The seat stay unit 50 has a rear end formed with a third mounting tube 52.

The carrier rack 60 has a front end portion formed with a pair of third mounting holes 601 which are aligned with the pair of second mounting holes 321 formed in the rear end portion 32 of the chain stay unit 30 and with the third mounting tube 52 of the seat stay unit 50. The rear end of the seat stay unit 50, the rear end portion 32 of the chain stay unit 30 and the front end portion of the carrier rack 60 are pivotally connected to each other by means of a third pivot bolt 521 that extends through the pair of second mounting holes 321, the pair of third mounting holes 601 and the third mounting tube 52. The carrier rack 60 is formed with a downwardly extending bearing unit 62 which has an inclined front bearing portion 621. Since the carrier rack 60 is pivotally connected to the seat stay unit 50 and the chain stay unit 30, the carrier rack 60 is movable between a folded position, in which the carrier rack 60 is disposed on the seat stay unit 50, and an unfolded position, in which the front bearing portion 621 of the bearing unit 62 abuts against the rear end portion 32 of the chain stay unit 30 so as to bear the weight of objects placed on the carrier rack 60.

Figure 3:
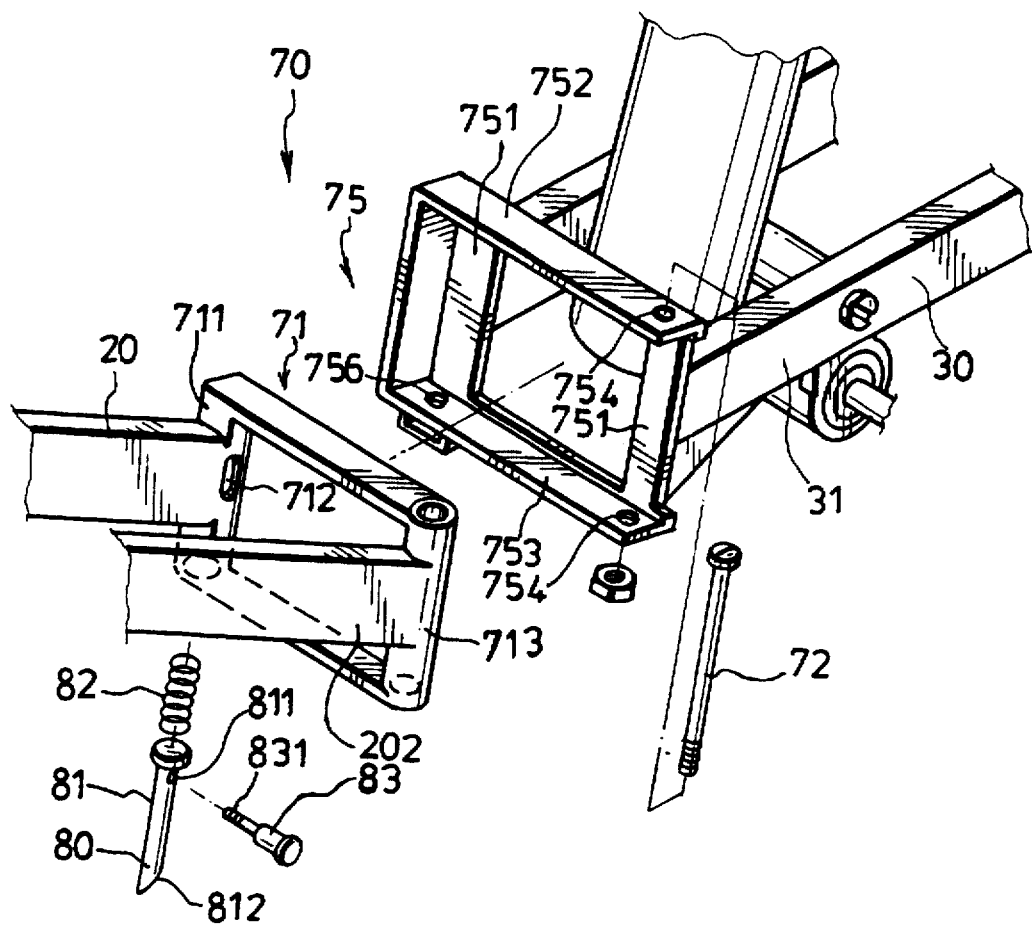
FIG. 3 is an exploded perspective view illustrating a folding unit of the foldable bicycle frame according to the preferred embodiment.

Referring to FIG. 3, the folding unit 70 includes a folding member 71 that is mounted on the rear end 202 of the downtube unit 20 and a folding seat 75 that is mounted on the front end portion 31 of the chain stay unit 30. The folding member 71 has two lateral first vertical portions. One of the first vertical portions is formed with a positioning tube 711 that is provided with an axially extending radial slot 712. The other one of the first vertical portions is formed with a pivot tube 713. The folding seat 75 has two lateral second vertical portions 751, and a top wall 752 and a bottom wall 753 that interconnect the second vertical portions 751. The folding member 71 is disposed between the top and bottom walls 752 and 753 of the folding seat 75. Each of the top and bottom walls 752 and 753 is formed with a pivot hole 754 that is aligned with the pivot tube 713 of the folding member 71. The bottom wall 753 of the folding seat 75 is further formed with a positioning hole 756 that is aligned with the positioning tube 711 of the folding member 71. The folding unit 70 further includes a pivot unit 72 which extends through the pivot holes 754 in the folding seat 75 and the pivot tube 713 of the folding member 71 to mount pivotally the folding member 71 to the folding seat 75. The folding unit 70 is further provided with a positioning unit 80 which includes a rod member 81, a spring member 82 and an operating member 83. The rod member 81 and the spring member 82 are received in the positioning tube 711 of the folding member 71. The spring member 82 biases the rod member 81 to extend into the positioning hole 756 in the folding seat 75 so as to lock the folding member 71 onto the folding seat 75. The rod member 81 has a tapered bottom end 812 and is formed with a radial screw hole 811 that is aligned with the radial slot 712 in the positioning tube 711 of the folding member 71. The tapered bottom end 812 of the rod member 81 facilitates movement of the folding. member 71 into a position in which the folding member 71 is disposed between the top and bottom walls 752 and 753 of the folding seat 75 and is locked onto the folding seat 75. The operating member 83 has a threaded end portion 831 that passes through the radial slot 712 and that engages the radial screw hole 811 in the rod member 81. The operating member 83 is operable to move upwardly so as to retract the rod member 81 into the positioning tube 711 to unlock the folding member 71 from the folding seat 75.

To assemble the foldable bicycle frame 1, the pivot unit 72 of the folding unit 70 is passed through the pair of pivot holes 754 in the folding seat 75 and the pivot tube 713 of the folding member 71. The rod member 81 and the spring member 82 are subsequently received in the positioning tube 711 with the spring member 82 disposed on top of the rod member 81. The operating member 83 is then passed through the radial slot 712 to engage the screw hole 811 in the rod member 81. Therefore, the operating member 83 extends radially from the rod member 81 and out of the radial slot 712 of the positioning tube 711 after being assembled onto the folding member 71. Referring again to FIG. 2, the hollow seat tube 41 is connected pivotally to the front end portion 31 of the chain stay unit 30 by passing the first pivot bolt 412 through the pair of first mounting holes 312 and the first mounting tube 413. The seat post 42 is then inserted into the hollow seat tube 4 with the annular groove 423 engaging the retaining member 44. The spring-loaded pin unit 43 is mounted on the radial tube 412 and extends therethrough and into a selected one of the radial holes 422 to fix the seat post 42 at a desired position. The seat stay 50 is then connected pivotally to the seat post 422 by passing each of the second pivot bolts 511 through one of the second mounting tube 51 and into an adjacent one of the tubular extensions 421 on the top end of the seat post 42 so that each of the second pivot bolts 511 engages one of the tubular extensions 421. The seat stay unit 50 and the carrier rack 60 are then pivotally connected to the chain stay unit 30 by passing the third pivot bolt 521 through the pair of second mounting holes 321 in the rear portion of the chain stay unit 30, the pair of third mounting holes 601 in the front end portion of the carrier rack 60, and the third mounting tube 52 of the seat stay unit 50. In this situation, the front bearing portion 621 of the bearing unit 62 abuts against the rear end portion 32 of the chain stay unit 30. The carrier rack 60 is thus capable of bearing the weight of objects placed thereon.

Figure 4:
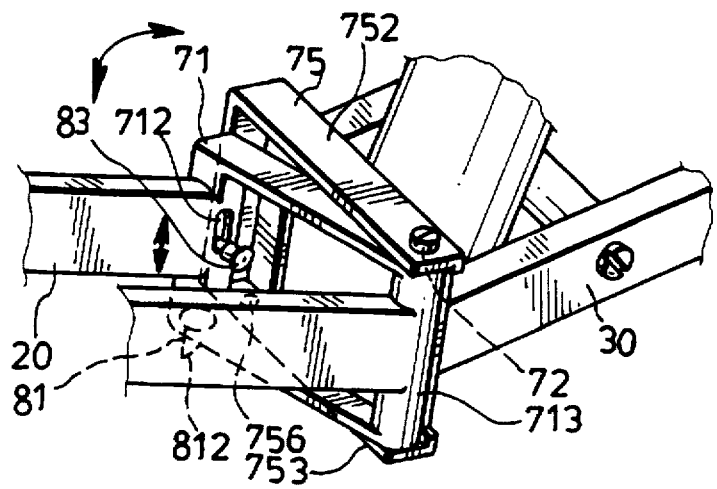
FIG. 4 illustrates how the folding unit shown in FIG. 3 is operated to connect the downtube unit to the chain stay unit of the foldable bicycle frame according to the preferred embodiment.
Figure 5:
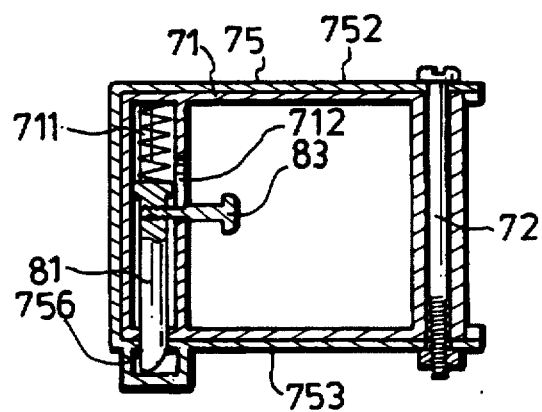
FIG. 5 is a cross sectional view of the folding unit of FIG. 3.
Figure 6:
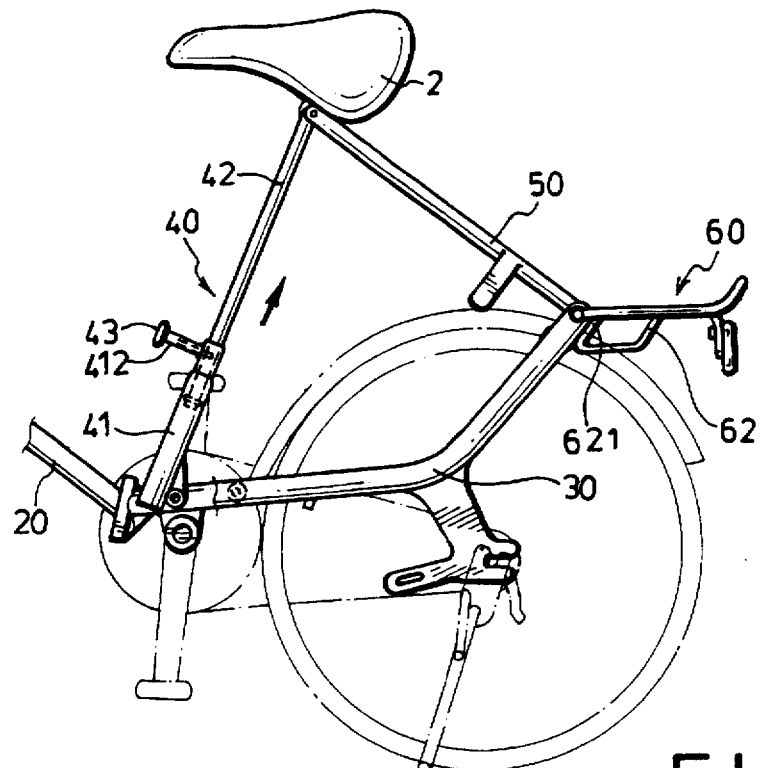
FIG. 6 illustrates the rear frame portion of the foldable bicycle frame shown in FIG. 1 after the foldable bicycle frame is unfolded and the telescopic seat unit is adjusted such that the bicycle seat is at a higher position for use.

To unfold the foldable bicycle frame 1 for use, as shown in FIGS. 4 and 5, the downtube unit 20 and the chain stay unit 30 are unfolded by simply pushing the folding member 71 towards the folding seat 75. The folding member 71 is then moved to a position between the top and bottom walls 752 and 753 of the folding seat 75 with the assistance of the tapered bottom end 812 of the rod member 81. The tapered bottom end 812 of the rod member 81 ultimately extends into the positioning hole 756 in the folding seat 75 to lock the folding member 71 onto the folding seat 75. The length of the seat unit 40 is then adjusted, as shown in FIG. 6, by pulling the spring loaded pin unit 43 outwardly from the tubular extension 412 of the seat tube 41 to permit upward movement of the seat post 42 to a desired position. The pin unit 43 is then released to extend through the tubular extension 412 and into a selected one of the radial holes 422 (shown in FIG. 2).

Figure 7:
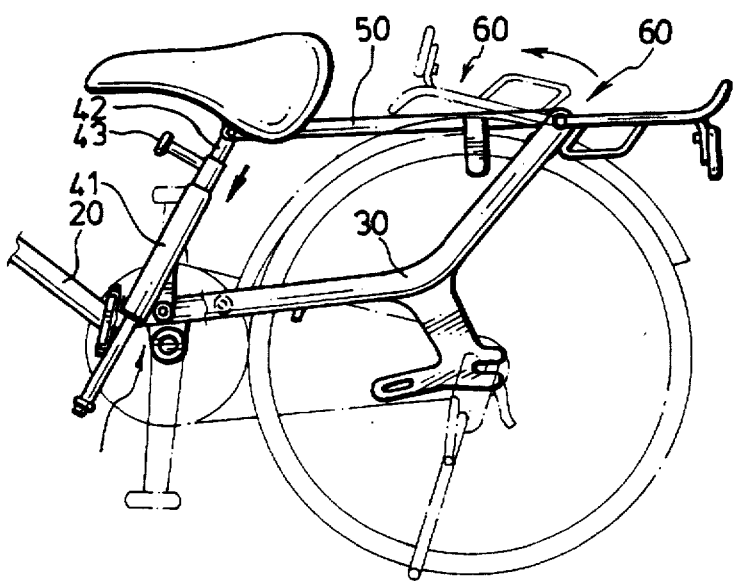
FIG. 7 illustrates the rear portion of the foldable bicycle frame shown in FIG. 1 in which the telescopic seat unit is adjusted to a shorter length before the bicycle frame is folded.

To fold the bicycle frame 1, as shown in FIGS. 1 and 7, the pin unit 43 is pulled outwardly once again to permit the seat post 42 to slide downwardly and be received in the seat tube 41. The carrier rack 60 is turned upwardly to be folded on the seat stay unit 50. The downtube unit 20 is then folded on the chain stay unit 30, as shown in FIGS. 4 and 5, by moving the operating unit 83 upwardly to retract the rod member 81 into the positioning tube 711 of the folding member 71 to unlock the folding member 71 from the folding seat 75.

With the use of the present invention, the rear bicycle frame portion, which includes the seat unit, the chain stay unit and the seat stay unit, can be folded into a structure that occupies a relatively small amount of space. Moreover, the foldable carrier rack in the present invention does not result in a substantial increase in the size of the bicycle frame after folding.

With this invention thus explained, it is apparent that numerous modifications and variations can be made without departing from the scope and spirit of this invention. It is therefore intended that this invention be limited only as indicated in the appended claims.

I claim:

1. A foldable bicycle frame comprising:

a head tube adapted to be coupled with a front fork for carrying a front bicycle wheel;

a downtube unit having a front end connected to said head tube, and a rear end;

a chain stay unit having a horizontal front end portion connected foldably to said rear end of said downtube unit and adapted to be mounted with a crank arm assembly, an inclined vertical rear end portion, and a middle portion that is between said front and rear end portions and that is provided with means for carrying a rear bicycle wheel thereon;

a telescopic seat unit having a top end adapted to be mounted with a bicycle seat thereon and a bottom end connected pivotally to said front end portion of said chain stay unit; and a seat stay unit having a front end pivoted to said top end of said seat unit and a rear end pivoted to said rear end portion of said chain stay unit.

2. The foldable bicycle frame according to claim 1, wherein said seat unit comprises a hollow seat tube connected pivotally to said front end portion of said chain stay unit and a seat post connected pivotally to said front end of said seat stay unit, said seat post extending slidably into said seat tube.

3. The foldable bicycle frame according to claim 2, wherein said seat post is formed with a plurality of axially aligned radial holes, said seat tube being formed with a radial tube extension, said seat unit being further provided with a pin unit that extends removably through said radial tube extension and into a selected one of said radial holes to permit adjusting of length of said seat unit.

4. The foldable bicycle frame according to claim 1, further comprising a carrier rack that has a front end portion mounted on said rear ends of said chain stay unit and said seat stay unit.

5. The foldable bicycle frame according to claim 4, wherein said front end portion of said carrier rack is pivoted to said rear ends of said chain stay unit and said seat stay unit and is formed with a bearing unit, said carrier rack being movable between a folded position, wherein said carrier rack is disposed on said seat stay unit, and an unfolded position, wherein said bearing unit abuts against said rear end of said chain stay unit.

6. The foldable bicycle frame according to claim 1, further comprising a folding unit for pivotally connecting said downtube unit to said chain stay unit, said folding unit including:

a folding member mounted on said rear end of said downtube unit and having two lateral first vertical portions, one of said first vertical portions being formed with a positioning tube that is provided with a radial slot, the other one of said first vertical portions being formed with a pivot tube;

a folding seat mounted on said front end portion of said chain stay unit and having two lateral second vertical portions, and a top wall and a bottom wall that interconnect said second vertical portions, said folding member being disposed between said top and bottom walls, each of said top and bottom walls being formed a pivot hole that is aligned with said pivot tube of said folding member, said bottom wall being further formed with a positioning hole that is aligned with said positioning tube of said folding member;

a pivot unit extending through said pivot holes in said folding seat and said pivot tube of said folding member to mount pivotally said folding member to said folding seat; and a positioning unit including a rod member which is received in said positioning tube of said folding member, a spring member which is received in said positioning tube and which biases said rod member to extend into said positioning hole in said folding seat to lock said folding member onto said folding seat, and an operating member which extends radially from said rod member and out of said radial slot of said positioning tube, said operating member being operable so as to retract said rod member into said positioning tube to unlock said folding member from said folding seat.

* * * * *